US006694440B1

(12) United States Patent
Ishibashi (10) Patent No.: US 6,694,440 B1
(45) Date of Patent: Feb. 17, 2004

(54) COMPUTER, NETWORK CONTROLLER, AND SYSTEM AND REMOTE ACTIVATING METHOD USING THE COMPUTER AND CONTROLLER

(75) Inventor: Yasuhiro Ishibashi, Ome (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/482,016

(22) Filed: Jan. 13, 2000

(30) Foreign Application Priority Data

Jan. 14, 1999 (JP) .......................... 11-007587

(51) Int. Cl.⁷ .............................. G06F 1/32
(52) U.S. Cl. ....................... 713/310; 713/300
(58) Field of Search ............... 713/310, 320, 713/300

(56) References Cited

U.S. PATENT DOCUMENTS

| | | | |
|---|---|---|---|
| 5,371,852 A | * 12/1994 | Attanasio et al. ........... 709/245 |
| 5,657,314 A | * 8/1997 | McClure et al. ............ 370/401 |
| 5,754,548 A | * 5/1998 | Hoekstra et al. ........... 370/402 |
| 5,802,305 A | * 9/1998 | McKaughan et al. ....... 709/227 |
| 5,828,656 A | 10/1998 | Sato et al. |
| 5,835,738 A | * 11/1998 | Blackledge, Jr. et al. ... 710/307 |
| 5,905,873 A | * 5/1999 | Hartmann et al. .......... 709/249 |
| 5,987,126 A | * 11/1999 | Okuyama et al. .......... 380/203 |
| 6,101,608 A | * 8/2000 | Schmidt et al. ............ 713/202 |
| 6,400,280 B1 | * 6/2002 | Osakabe ................ 340/825.25 |
| 6,421,782 B1 | * 7/2002 | Yanagisawa et al. ....... 713/201 |
| 6,496,509 B1 | * 12/2002 | Fant ............................ 370/400 |
| 6,501,767 B1 | * 12/2002 | Inoue et al. ................. 370/465 |
| 6,512,767 B1 | * 1/2003 | Takeda et al. .............. 370/389 |

OTHER PUBLICATIONS

1394 Trade Association Power Specification, Part 2: Suspend/Resume Implementation Guidelines, Revision 1.0, Oct. 5, 1999.*
1394 Trade Association Power Specification, Part 1: Cable Power Distribution.*
Fujitsu, IEEE 1394 Serial Bus Controller, Nov. 1996.*
A. Kunzman, Alan Wetzel, 1394 High Performance Serial Bus: The Digital Interface for ATV.*
D. Anderson, Firewire System Archetecture, Second edition, 1998, p. 299.*

* cited by examiner

Primary Examiner—Thomas Lee
Assistant Examiner—Paul Yanchus, III
(74) Attorney, Agent, or Firm—Finnegan, Henderson, Farabow, Garrett & Dunner, L.L.P.

(57) ABSTRACT

A personal computer is connected to a 1394/LAN bridge adapter via a 1394 bus and is connected to a LAN via the 1394 bus and the 1394/LAN bridge adapter. When receiving a remote activation packet from the LAN, the 1394/LAN bridge adapter converts the received packet into a Link-on packet and transmits this Link-on packet to the computer via the 1394 bus. The computer uses the reception of the Link-on packet from the 1394 bus as a cause of generating a wake up event and thereby returns to an operation state when receiving the Link-on packet. Thus, the computer can be remotely activated from the LAN when the computer is connected to the LAN via a serial bus.

6 Claims, 7 Drawing Sheets

COMPUTER, NETWORK CONTROLLER, AND SYSTEM AND REMOTE ACTIVATING METHOD USING THE COMPUTER AND CONTROLLER

BACKGROUND OF THE INVENTION

The present invention relates to a computer having a serial bus interface connectable to a serial bus such as IEEE1394, a network controller applicable to this computer, and a system and remove activating method using the computer and the network controller.

Recently, to improve the portability of notebook personal computers (to be preferred to as PCs hereinafter), the heights and weights of computer main bodies are being decreased. As the heights and weights thus decrease, conventional connectors are becoming unmountable. In particular, a port (100 BASE-TX;RJ45) for connecting with a LAN (Local Area Network) is in many cases mounted on an extension device called a port replicator or base dock, since this port is unnecessary in mobile environments. However, even in a case like this the main body of a notebook PC requires a docking connector for connecting with this extension device. Hence, this construction is still unsatisfactory to implement lower profiles and lighter weights.

Accordingly, a technique is recently beginning to be demanded by which a notebook PC is equipped with only a serial bus interface such as IEEE1394 and connected to a LAN via a serial bus connected to this serial bus interface. Even when a notebook PC is thus connected to a LAN via a serial bus, this notebook PC must be able to be remotely activated from the LAN. This is to allow the system manager to remotely activate PCs in the office at night to automatically perform maintenance, e.g., update software in these PCs, thereby reducing the TCO (Total Cost of Ownership).

This remote activation is usually implemented by a mechanism by which a server transmits a remote activation packet to a PC via a LAN and, upon receiving this packet, the internal LAN controller of the PC generates a wake up signal to an internal power managing mechanism of the PC. However, when a notebook PC is connected to a LAN via a serial bus, the LAN controller is provided in a bridge device for connecting the LAN to the serial bus extending from the notebook PC. Therefore, it is in practice difficult to directly transmit a wake up signal from the LAN controller to the power managing mechanism in the PC. Hence, the conventional remote activating method cannot remotely activate a notebook PC connected to a LAN via a serial bus.

BRIEF SUMMARY OF THE INVENTION

Accordingly, it is an object of the present invention to provide a computer, a network controller, and a system and remote activating method using the computer and the network controller, by which the conventional remote activating method is improved to realize remote activation from the LAN even when a PC is connected to the LAN via a serial bus.

According to one aspect of the present invention, there is provided a computer comprising: a serial bus interface for communicating with another node on a serial bus; a power controller; and wake up signal transmitting means for transmitting, when the serial bus interface receives a Link-on packet for activating the serial bus interface via the serial bus, a wake up signal to the power controller in response to the Link-on packet, thereby returning the computer to an operation state.

In this computer, the serial bus interface may comprise first interface means having a physical layer function for exchanging an electrical signal via the serial bus, and second interface means having a link layer function for providing data transfer service between the first interface means and a higher transaction layer, and the wake up signal transmitting means may be connected to a signal line which outputs a Link-on signal from the first interface means to the second interface means when the first interface means receives the Link-on packet, and may transmit a wake up signal to the power controller in response to the Link-on signal.

In this computer, the wake up signal transmitting means may be provided in the serial bus interface.

In this computer, the serial bus may be an IEEE1394 bus.

According to another aspect of the present invention, there is provided a network controller for connecting a computer to a computer network, comprising: a first interface connectable to a serial bus interface of the computer via a serial bus; a second interface connectable to the computer network; means for mutually connecting the first and second interfaces to thereby connect the computer to the computer network via the serial bus; and packet converting means for converting, when a remote activation request packet addressed to the computer is received from the computer network, the received remote activation request packet into a Link-on packet which a root node on the serial bus uses to activate a serial bus interface of another node on the serial bus, and transmitting the Link-on packet to the computer via the serial bus, thereby remotely activating the computer from the computer network.

In this network controller, the remote activation request packet may be one of a magic packet using a predetermined bit pattern and a specific pattern packet using any of several predetermined specific bit patterns, the network controller may further comprise storage means for storing contents of the specific bit patterns used as the specific pattern packet, and detecting means for detecting whether the received remote activation request packet is the magic packet or a specific pattern packet matching one of the specific bit patterns stored in the storage means, and the packet converting means may convert the received remote activation request packet into the Link-on packet when the detecting means detects a match.

In this network controller, the Link-on packet may be a packet which only a root node on the serial bus may issue to another node on the serial bus, and the network controller may further comprise means for delaying participation of the network controller into a tree identification protocol such that the network controller is determined as a root node in tree identification on the serial bus.

In this network controller, the serial bus may be an IEEE1394 bus.

In this network controller, the computer network may be a LAN (Local Area Network).

According to still another aspect of the present invention, there is provided a computer system comprising: a computer having a serial bus interface for communicating with another node on a serial bus; and a network controller having a first interface connectable to the serial bus and a second interface connectable to a computer network, the network controller connecting the computer to the computer network via the serial bus, wherein the network controller comprises packet converting means for converting, when a remote activation request packet addressed to the computer is received from the computer network, the received remote activation request packet into a Link-on packet which a root node on the serial bus uses to activate a serial bus interface of another node on the serial bus, and transmitting the Link-on packet to the computer via the serial bus, and the computer comprises wake up control means for returning, when the serial bus interface of the computer receives a Link-on packet addressed to the computer, the computer to an operation state in response to the reception of the Link-on packet.

In this system, the serial bus may be an IEEE1394 bus.

In this system, the computer network may be a LAN (Local Area Network).

According to still another aspect of the present invention, there is provided a remote activating method of activating from a computer network a node having a serial bus interface for connecting with a serial bus, comprising the steps of: receiving a remote activation request packet addressed to a specific node on the serial bus from the computer network by using a network controller for connecting the specific node to the computer network; converting the received remote activation request packet into a Link-on packet which a root node on the serial bus uses to activate a serial bus interface of another node; and transmitting the converted Link-on packet from the network controller to the specific node via the serial bus, thereby remotely activating the specific node from the computer network.

In this method, the serial bus may be an IEEE1394 bus.

In this method, the computer network may be a LAN (Local Area Network).

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention in which.

DETAILED DESCRIPTION OF THE INVENTION

An embodiment of the present invention will be described below with reference to the accompanying drawings.

Figure 1:
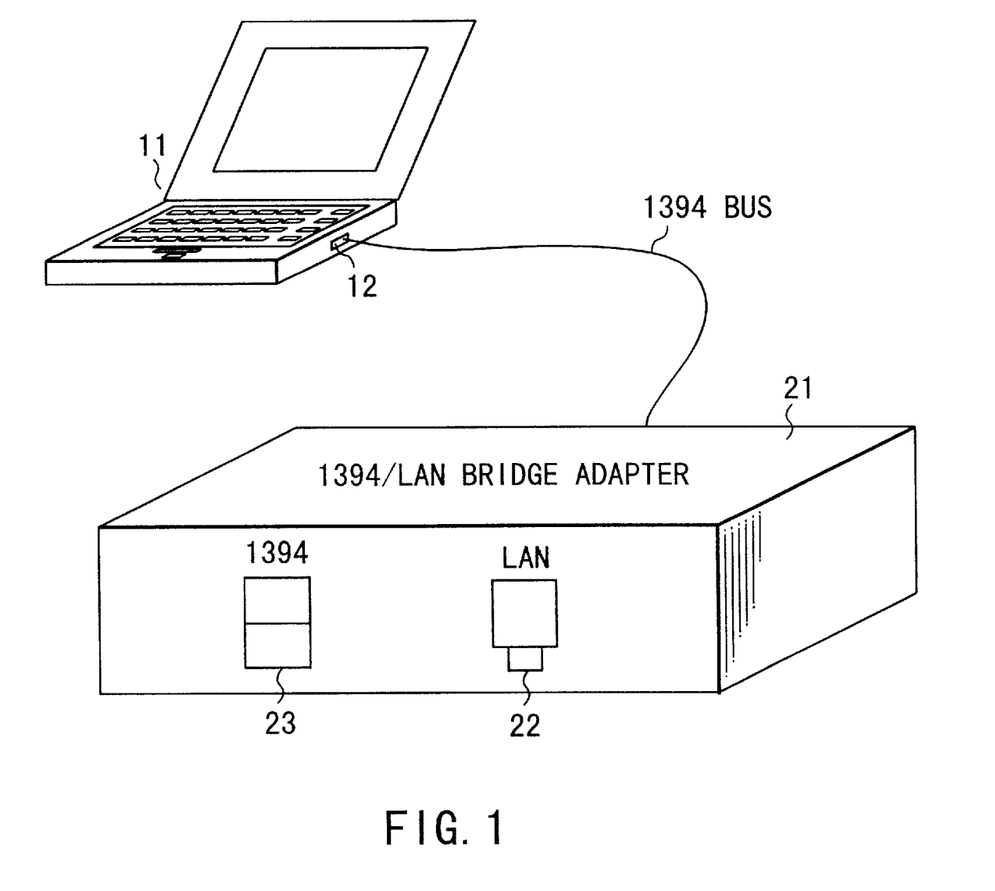
FIG. 1 is a view showing the external appearance of a computer system according to one embodiment of the present invention.

FIG. 1 shows the external appearance of a computer system according to the embodiment of the present invention. This computer system comprises a notebook PC main body 11 and a 1394/LAN bridge adapter 21. As shown in FIG. 1, the notebook PC main body 11 has a 1394 serial bus interface port (1394 port) 12 for communicating with another node (1394 device) on a 1394 bus via an IEEE1394 serial bus (to be referred to as a 1394 bus hereinafter).

The 1394/LAN bridge adapter 21 is a network adapter for connecting the 1394 bus to a LAN. This 1394/LAN bridge adapter 21 has a function as a node on the 1394 bus and a function as a network controller for connecting the notebook PC 11 to the LAN via the 1394 bus.

To connect the notebook PC main body 11 to a LAN, as shown in FIG. 1, the notebook PC main body 11 is connected to the 1394/LAN bridge adapter 21 via a 1394 bus cable. Also, a LAN cable is connected to a LAN port (100 BASE-TX;RJ45) of the 1394/LAN bridge adapter 21.

The 1394/LAN bridge adapter 21 holds its unique network physical address (MAC address) and node number information for uniquely identifying the notebook PC main body 11. When receiving from the LAN an Ethernet packet that designates its MAC address as a destination address, the 1394/LAN bridge adapter 21 converts this Ethernet packet into an IEEE1394 packet and transmits the packet to the notebook PC main body 11. This IEEE1394 packet contains the node number information of the notebook PC main body 11 as the destination address. When the notebook PC main body 11 is to transmit data to a device on the LAN, the notebook PC main body 11 converts an Ethernet packet to be transmitted into an IEEE1394 packet containing node number information of the 1394/LAN bridge adapter 21 as a destination address, and transmits the packet to the 1394/LAN bridge address 21. The 1394/LAN bridge adapter 21 returns the received IEEE1394 packet into the Ethernet packet and outputs the packet onto the LAN. Accordingly, to a device on the LAN the notebook PC main body 11 acts as one network terminal directly connected to the LAN.

The principle of remote activation as the characteristic feature of this embodiment will be described below.

In this embodiment, to allow a server computer and the like on the LAN to remotely activate the notebook PC main body 11 connected to a LAN via the 1394 bus, the notebook PC main body 11 is remotely activated by using a Link-on packet defined by the IEEE1394 standard. That is, when receiving a remote activation packet from the LAN, the 1394/LAN bridge adapter 21 converts this packet into a Link-on packet and transmits this Link-on packet to the notebook PC main body 11 via the 1394 bus.

Figure 10:
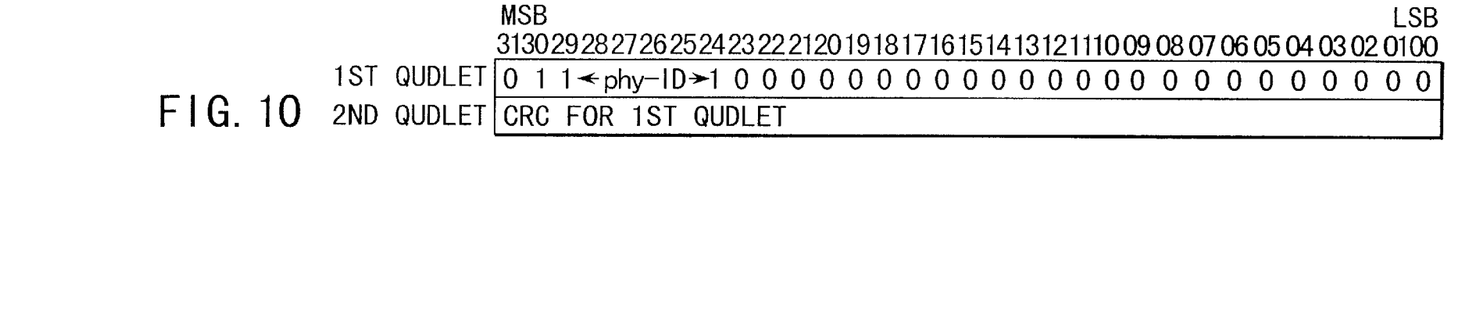
FIG. 10 is a view showing the format of a Link-on packet used in remote activation of the notebook PC shown in FIG. 2.

A Link-on packet is a power management packet for activating the link layer or the transaction layer of the 1394 serial bus interface, formed in a node on the 1394 bus. Commonly, when a new node capable of being linked to the 1394 bus appears, a root node for managing the 1394 bus transmits a Link-on packet. The link layer or the transaction layer of a node which has received this Link-on packet can start processing and can communicate with another node on the 1394 bus. FIG. 10 shows the packet format of a Link-on packet.

A packet on the 1394 bus is composed of a series of qudlets (32 bits). A Link-on packet is composed of two qudlets. The first qudlet has a bit pattern as shown in FIG. 10. The 29th bit to the 24th bit contain the physical node ID (Phy_ID) of the destination. The second qudlet is constructed of CRC (Cyclic Redundancy Check) information of the first qudlet.

When receiving a remote activation packet from the LAN, the 1394/LAN bridge adapter 21 generates a Link-on packet containing the physical node ID of the 1394 serial bus interface of the notebook PC main body 11, and outputs this Link-on packet to the 1394 bus.

The notebook PC main body 11 has three modes: an operation state (power ON), a halt state (power OFF), and an intermediate sleep state (standby). When a predetermined wake up event occurs in the halt state or the sleep state, the notebook PC main body 11 returns to the operation state in response to the event. In this embodiment, in addition to a ring signal as incoming call information from a modem, the reception of a Link-on packet from the 1394 bus is used as a cause of generating a wake up event.

Figure 2:
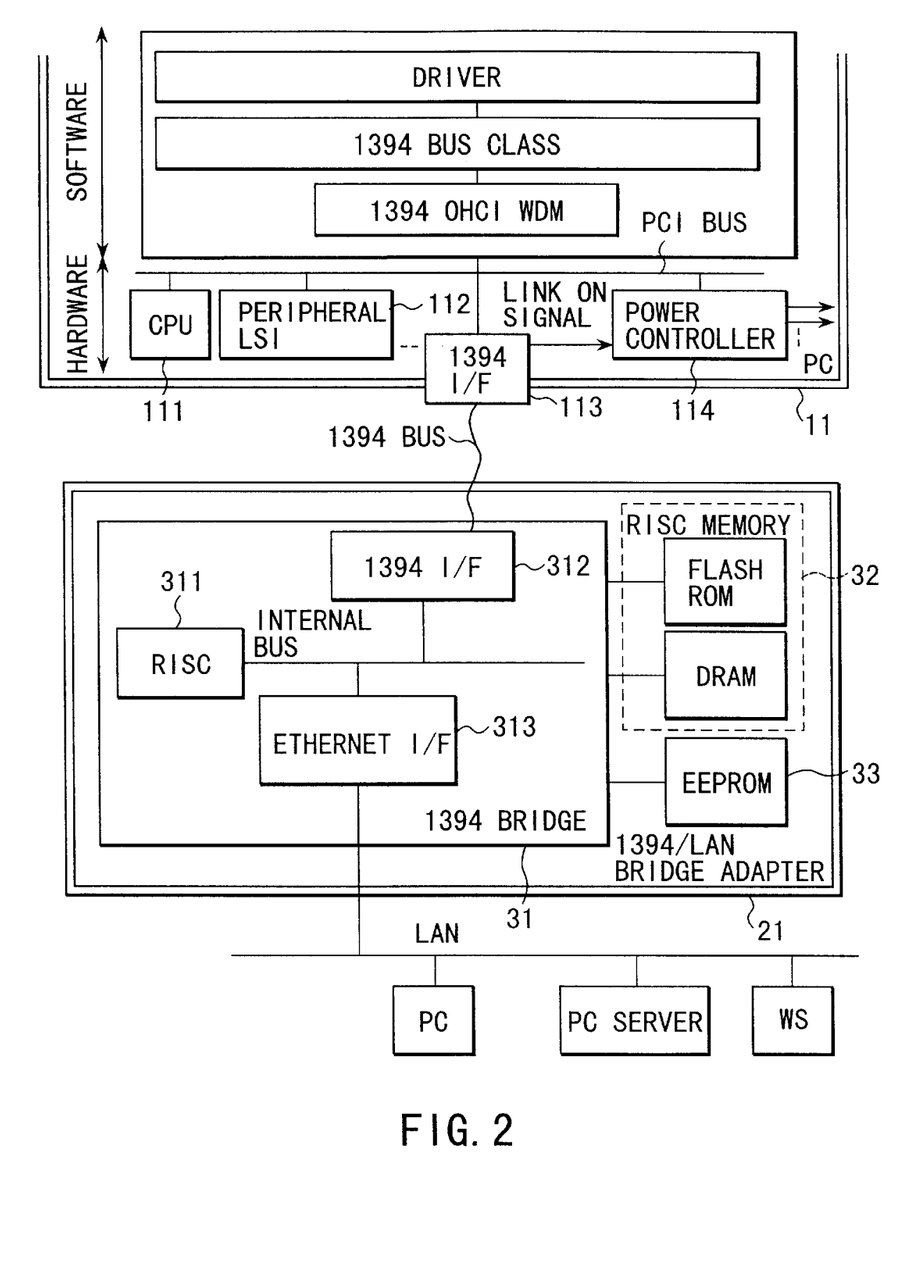
FIG. 2 is a block diagram showing the internal arrangements of a notebook PC and a 1394/LAN bridge adapter constructing the computer system of the embodiment.

FIG. 2 shows the internal arrangements of the notebook PC main body 11 and the 1394/LAN bridge adapter 21.
(Notebook PC)

As shown in FIG. 2, the notebook PC main body 11 includes a CPU 111, various peripheral LSIs 112, a 1394 serial bus interface 113, and a power controller 114.

The power controller 114 performs power management of the notebook PC main body 111. Even when the notebook PC main body 11 is in the halt state or the sleep state, minimum necessary operating power is kept supplied to this power controller 114 and the 1394 serial bus interface 113. If a predetermined wake up event occurs, the power controller 114 starts supplying power to each unit. Accordingly, the notebook PC main body 11 returns to the operating state from the halt state or the sleep state.

The 1394 serial bus interface 113 communicates with another 1394 node via the 1394 bus. The operation of this 1394 serial bus interface is controlled by software composed of drivers as shown in FIG. 2. When receiving a Link-on packet addressed to its own node, the 1394 serial bus interface 113 transmits a Link-on signal indicating the reception of this Link-on packet to the power controller 114 as a wake up event.

Figure 4:
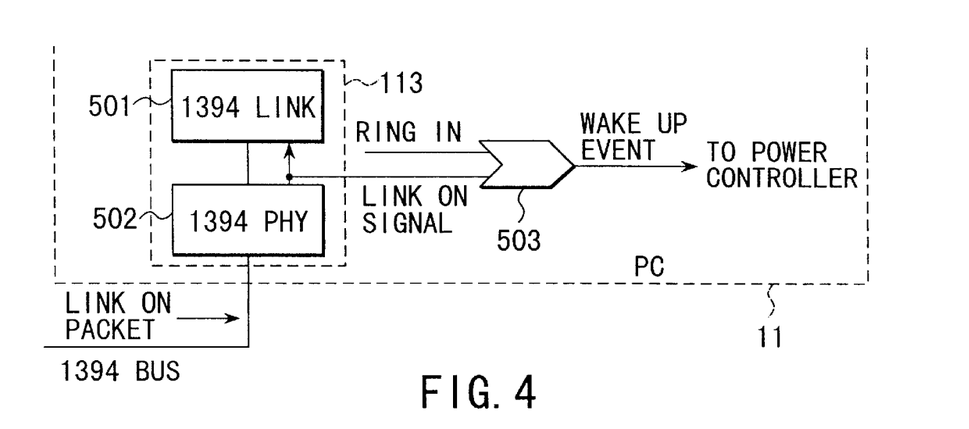
FIG. 4 is a block diagram showing a practical connection between a 1394 serial bus interface and a power controller of the notebook PC shown in FIG. 2.

FIG. 4 shows a practical connection between the 1394 serial bus interface and the power controller 114.

As shown in FIG. 4, the 1394 serial bus interface 113 includes a 1394 Link chip 501 and a 1394 PHY chip 502. The 1394 Link chip 501 has a function as a link layer for providing data transfer service between the physical layer and a higher transaction layer. The 1394 PHY chip 502 has a function of a physical layer for exchanging electrical signals via the 1394 bus.

When receiving a Link-on packet addressed to its own node, the 1394 PHY chip 502 outputs a Link-on signal to the 1394 Link chip 501. Consequently, the 1394 serial bus interface 113 is set to be active (operable). This Link-on signal is also supplied to one input terminal of an OR gate 503 the other input terminal of which receives an incoming call information signal (Ring In) from a modem. The output from this OR gate 503 is supplied as a Wake Up event to the power controller 114.
(1394/LAN Bridge Adapter)

As shown in FIG. 2, the 1394/LAN bridge adapter 21 comprises a 1394 bridge unit 31, a RISC memory 32, and an EEPROM 33. The 1394 bridge unit 31 includes a RISC processor 311, a 1394 serial bus interface 312, and an Ethernet interface 313. The 1394 serial bus interface 312 is connected to the notebook PC main body 11 via the 1394 bus. The Ethernet interface 313 is connected to the LAN.

The RISC memory 32 is constructed of a flash ROM and a work DRAM. The flash ROM stores program codes for the RISC processor, the Ethernet physical address (MAC address) of the 1394/LAN bridge adapter 21, the node number information (node ID) for uniquely identifying the notebook PC main body 1 on the 1394 bus, and the like.

Ethernet remote activation packets (wake up packets) are classified into a magic packet having a predetermined bit pattern and a specific pattern activation packet (interesting packet) using one of several predetermined specific bit patterns. The EEPROM 33 prepares a pattern matching table for specific pattern activation packets. This pattern matching table holds the contents of specific bit patterns used as specific pattern activation packets.

Figure 3:
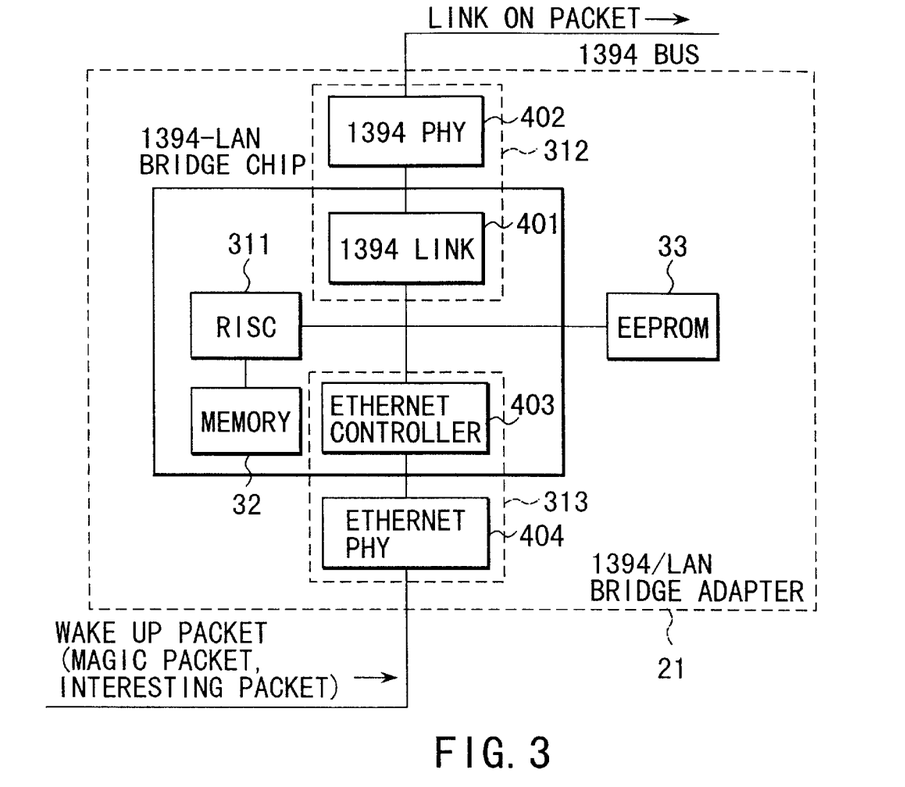
FIG. 3 is a block diagram showing details of the arrangement of the 1394/LAN bridge adapter shown in FIG. 2.

FIG. 3 shows a practical packaging example of the 1394/LAN bridge adapter 21. Referring to FIG. 3, the RISC processor 311, the RISC memory 32, a 1394 Link unit 401 having the link layer function of the 1394 interface, and an Ethernet controller 403 are integrated on one chip (1394-LAN bridge chip). A 1394 PHY unit 402, an Ethernet PHY unit 404 having the Ethernet physical layer function, and the EEPROM 33 are implemented as an external chip of the 1394-LAN bridge chip.

When a remote activation packet (wake up packet) addressed to the notebook PC 11, i.e., containing the MAC address of the 1394/LAN bridge adapter 21 as a destination address, is transmitted from the LAN, the RISC processor 311 converts the packet into a Link-on packet addressed to the notebook PC 11 and outputs this Link-on packet to the 1394 bus.
(Software Structure of Notebook PC)

The internal software structure of the notebook PC 11 will be described below with reference to FIG. 5.

Figure 5:
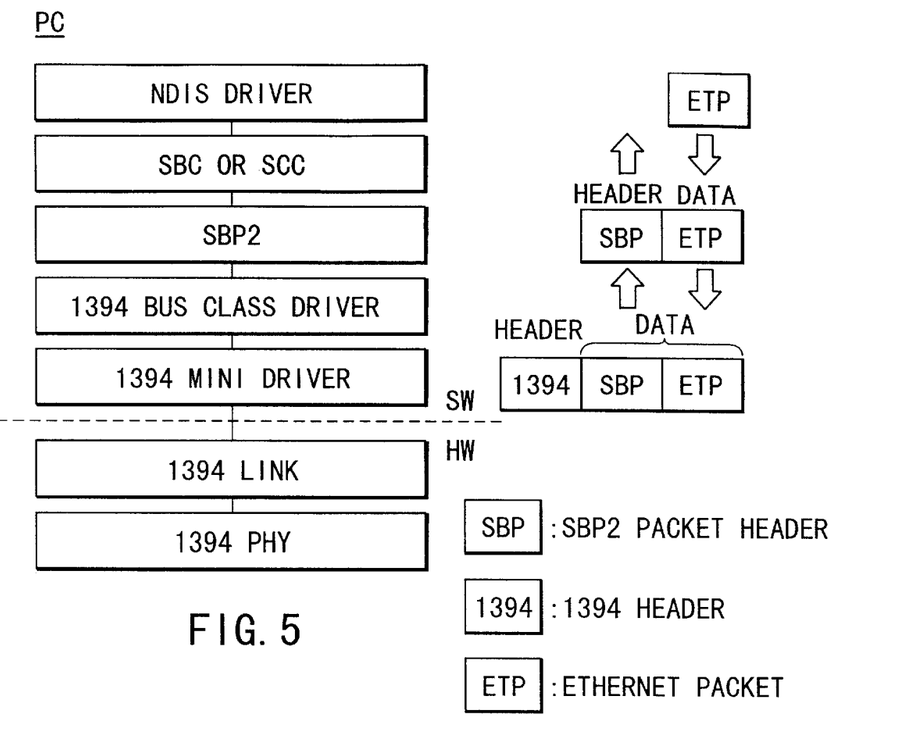
FIG. 5 is a view for explaining the software structure of the notebook PC shown in FIG. 2.

As shown in FIG. 5, as software for realizing LAN connection via the 1394 bus, the notebook PC 11 is provided with an NDIS (Network Driver Interface Specification) driver and an SBC (or SCC) driver, each functioning as an Ethernet driver, a serial bus protocol (SBP2) driver positioned above the 1394 data link layer, and a 1394 bus class driver and a 1394 mini driver for controlling the 1394 serial bus interface.

When the notebook PC 11 is to transmit data to another PC or the like on the LAN, the NDIS driver generates an Ethernet packet (ETP) and sends the packet to the SBP2 driver via the SBC driver. The SBC driver adds an SBP2 packet header (SBP) to this Ethernet packet (ETP) and sends the packet to the 1394 mini driver via the 1394 bus class driver. The 1394 bus class driver or the 1394 mini driver further adds a 1394 header (1394) to the received packet to generate a 1394 packet containing the SBP2 header and the Ethernet packet as data. This 1394 packet is transmitted to the 1394 bus via 1394 Link and 1394 PHY as hardware constructing the 1394 serial bus interface.

When the notebook PC 11 is to receive data from another PC or the like on the LAN, the reverse procedure is executed. That is, a 1394 packet containing an SBP2 packet header and an Ethernet packet as data is output to the 1394 bus via the 1394/LAN bridge adapter 21. The 1394 bus class driver or the 1394 mini driver removes the 1394 header (1394), and the SBP2 driver removes the SBP2 packet header (SBP). After that, the original Ethernet packet (ETP) transmitted from the other PC or the like on the LAN is transferred to the NDIS driver.

(Firmware Structure of 1394/LAN Bridge Adapter)

The internal firmware structure of the 1394/LAN bridge adapter 21 will be described below with reference to FIG. 6.

Figure 6:
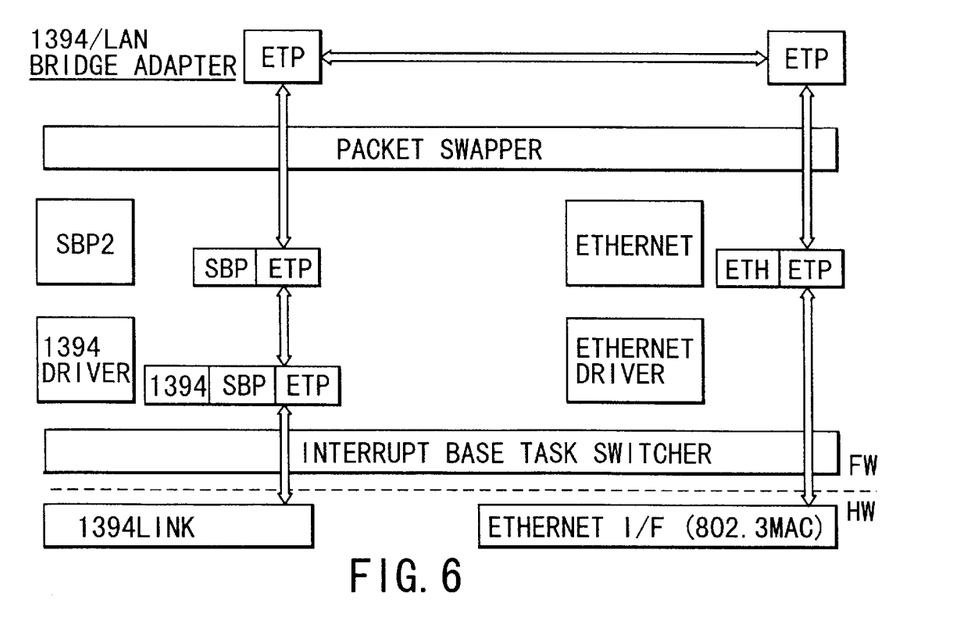
FIG. 6 is a view for explaining the firmware structure of the 1394/LAN bridge adapter shown in FIG. 2.

As shown in FIG. 6, to realize mutual connection between the 1394 bus and the LAN, in the 1394/LAN bridge adapter 21 firmware (Packet Swapper) for exchanging packets exists between drivers for LAN control and drivers for 1394 bus control. Also, task switching firmware (Interrupt base Task Switcher) is provided to selectively activate the LAN control drivers and the 1394 bus control drivers.

When a packet addressed to another PC on the LAN is received from the notebook PC 11 via the 1394 bus, the 1394 bus control drivers are activated. The 1394 drivers remove the 1394 header (1394), and the SBP2 driver removes the SBP2 packet header (SBP). After that, an original Ethernet packet (ETP) addressed to another PC on the LAN is extracted and output onto the LAN via the LAN control drivers.

When an Ethernet packet (ETP) addressed to the notebook PC 11 is received from another PC on the LAN, the reverse procedure is followed. That is, a 1394 packet is generated by adding the 1394 header (1394) to data including the SBP2 packet header (SBP) and the Ethernet packet (ETP), and this 1394 packet is output to the 1394 bus.

(Packet Conversion)

Figure 7:
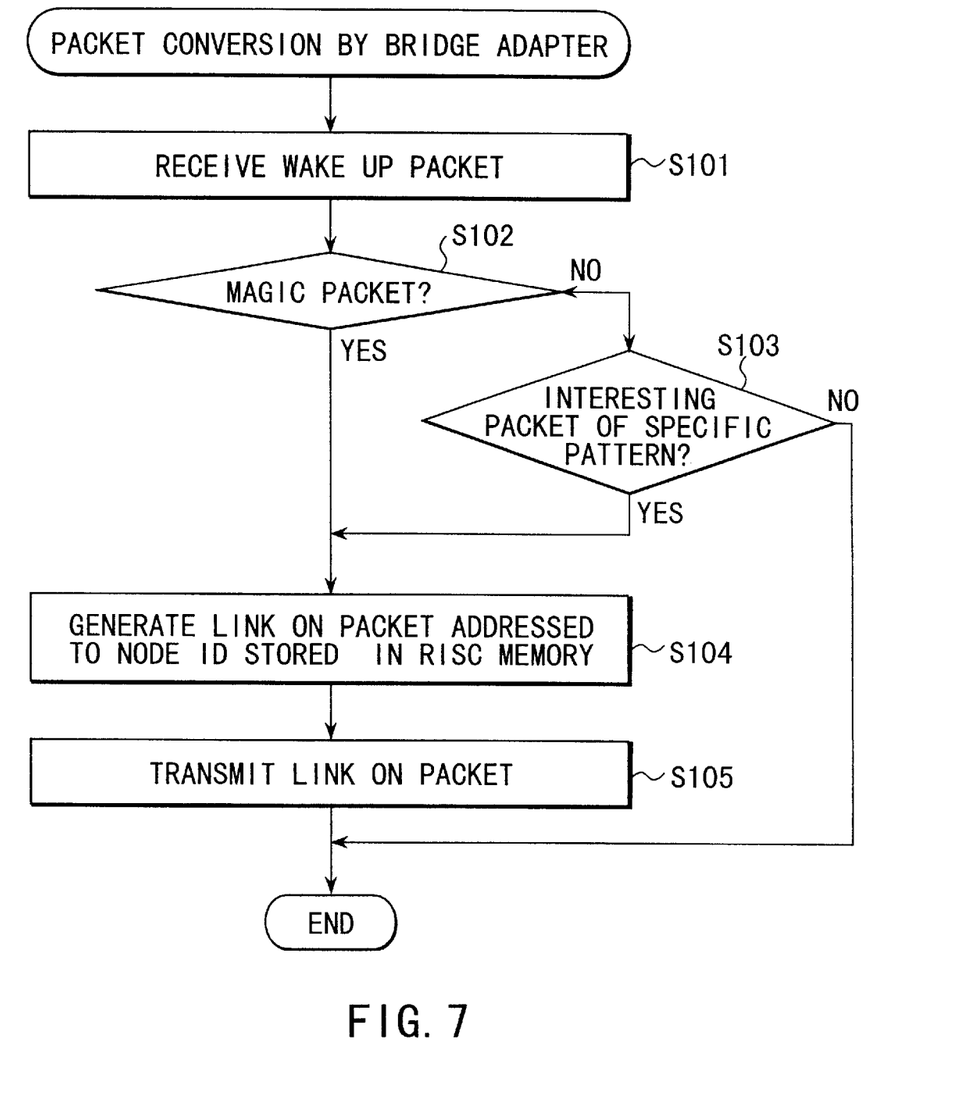
FIG. 7 is a flow chart showing the procedure of packet conversion executed by the 1394/LAN bridge adapter shown in FIG. 2.

The procedure of packet conversion for remote activation executed by the 1394/LAN bridge adapter 21 will be described below with reference to FIG. 7.

When receiving a remote activation packet (Wake up packet) containing the MAC address of the 1394/LAN bridge adapter 21 as a destination address (step S101), the Ethernet controller 403 informs the RISC processor 311 of the reception of the remote activation packet. The RISC processor 311 checks whether the received remote activation packet is a magic packet or a specific pattern activation packet (steps S102 and S103).

If the packet is a magic packet (YES in step S102), the RISC processor converts this magic packet into a Link-on packet addressed to the notebook PC 11 by using the node ID of the notebook PC 11, which is stored in the RISC memory 32 (step S104), and outputs the Link-on packet to the 1394 bus (step S105).

If the packet is not a magic packet (NO in step S102), the RISC processor 311 searches the pattern matching table of the EEPROM 33 for a pattern matching the received pattern (step S103). If a pattern matching the received pattern exists, the RISC processor 311 converts this packet into a Link-on packet addressed to the notebook PC 11 by using the node ID of the notebook PC 11, which is stored in the RISC memory 32 (step S104), and outputs the Link-on packet to the 1394 bus (step S105).

As described above, when the pattern matching table of the EEPROM 33 is prepared, remote activation can be performed not only by a magic packet but also by a specific pattern activation packet.

(Wake Up Process)

Figure 8:
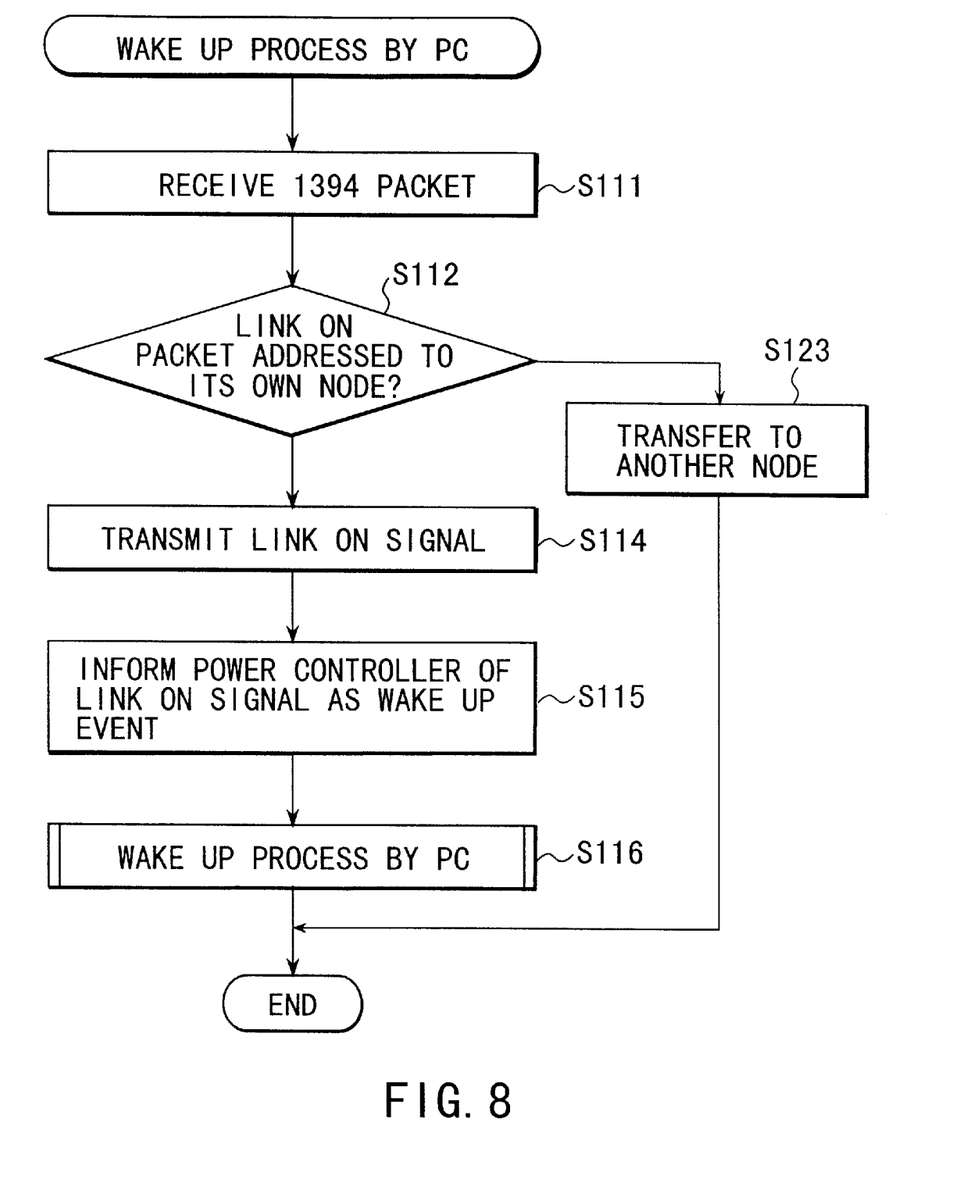
FIG. 8 is a flow chart showing the procedure of a wake up process by the notebook PC shown in FIG. 2.

The procedure of a wake up process executed by the notebook PC 11 will be described below with reference to a flow chart in FIG. 8.

When receiving a 1394 packet (step Sill), the 1394 serial bus interface 113 of the notebook PC 11 checks whether the packet is a Link-on packet addressed to its own node (step S112). If the packet is not a Link-on packet addressed to its own node, the 1394 serial bus interface 113 does not respond to the packet. If the notebook PC is a branch node, the Link-on packet is transferred to another node from a port different from the reception port (step S113).

If the packet is a Link-on packet addressed to its own node, the 1394 PHY chip 502 outputs a Link-on signal to the 1394 Link chip 501 (step S114). The power controller 114 is informed of this Link-on signal as a wake up event (step S115). Consequently, power is supplied to each unit of the notebook PC 11 to perform the wake up process for returning to the operation state from the halt state or the sleep state (the process is OS boot in the case of wake up from the halt state, and is resume for restoring the system status from the memory or the hard disk to return to the operation state in the case of wake up from the sleep state) (step S116)

(Connection)

Figure 9:
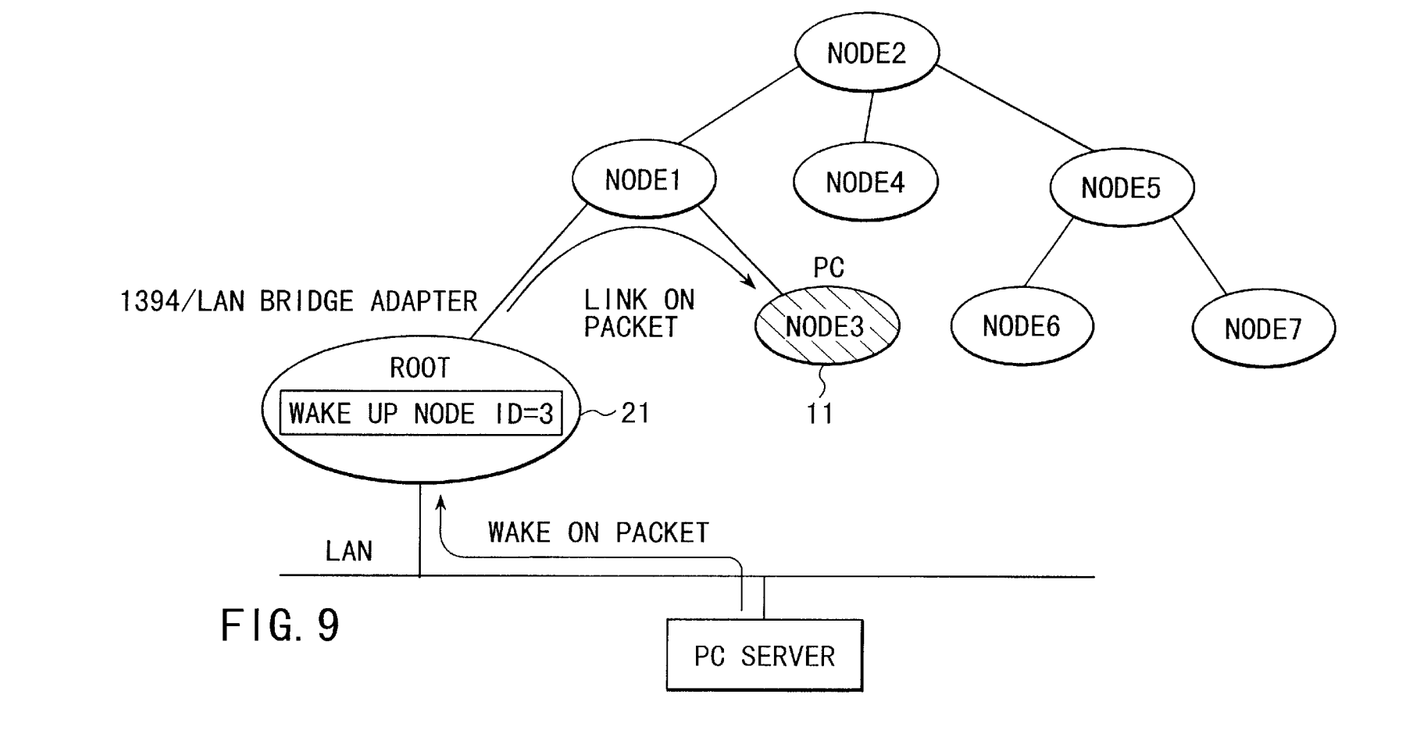
FIG. 9 is a view showing another form of connection between the notebook PC and the 1394/LAN bridge adapter shown in FIG. 2.

In this embodiment as described above, the notebook PC 11 is remotely activated by using a Link-on packet on the 1394 bus. In this case it is necessary to output a Link-on packet containing the node ID of this notebook PC 11 onto the 1394 bus. As shown in FIG. 9, another 1394 node can exist between the notebook PC 11 and the 1394/LAN bridge adapter 21. If the node ID of the notebook PC 11 is "3" as shown in FIG. 9, this value of the node ID is stored in the 1394/LAN adapter 21 as destination node information of a Link-on packet. This means that any arbitrary node on the 1394 bus can be remotely activated from the LAN by using the value of the destination node information set in the 1394/LAN bridge adapter 21.

(Tree Identification)

A method of always operating the 1394/LAN bridge adapter 21 as a root node will be described below.

As described earlier, a Link-on packet can be transmitted only by a root node, so the 1394/LAN bridge adapter 21 must always operate as a root node.

This is accomplished by intentionally delaying the participation of the 1394/LAN bridge adapter 21 into a tree identification protocol as an initialization process performed on the 1394 serial bus. The tree identification protocol is to identify individual nodes on the 1394 bus as they are connected like a tree, after the 1394 bus is initialized. This process identifies overall routes from one root node to branch nodes or leaf nodes connected to the root node.

When the 1394/LAN bridge adapter 21 is initialized, information designating a longer waiting time than default waiting times set in other nodes is set in a variable STATE__SET.force__root of the 1394/LAN bridge adapter 21, so that the 1394/LAN bridge adapter 21 participates last in the tree identification protocol. This setting is executed by the RISC processor 311.

When the tree identification is started, each node outputs a signal "parent__notify" from its own 1394 port after the elapse of a time determined in its own STATE__SET.force__root. A branch node having a plurality of 1394 ports receives parent__notify from each port. If the number of ports that have received parent__notify becomes one, the branch node waits until a time determined in its own STATE__SET.force__root elapses, and transmits parent__notify from the other ports. A node which does not transmit parent__notify and has received parent__notify from all ports is determined as a root node by transmitting child__notify from each port.

In the 1394/LAN bridge adapter 21, the RISC processor 311 does not output parent__notify until a time determined in its own STATE__SET.force__root elapses. Accordingly, the 1394/LAN bridge adapter 21 can receive parent__notify from other nodes and hence is determined as a root node.

In the present invention as has been described above, even when connected to a computer network via a serial bus a computer can be remotely activated from this computer network.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic apparatus, comprising:

a receiver configured to receive first control data transmitted in a first transmission format via a network, the first control data including a first control command and a destination address of a device to be controlled, wherein the first control command and the destination address comply with the first transmission format;

a producer configured to produce second control data from the received first control data by converting the first control command to a second control command that complies with a second transmission format and adding a terminal address that complies with the second transmission format and corresponds to the destination address; and a memory configured to store a plurality of specific bit patterns, and a detector configured to detect whether the first control command corresponds to a magic packet having a predetermined bit pattern or a specific pattern packet associated with one of the plurality of specific bit patterns stored in the memory, wherein the producer converts the first control command to a link-on packet that complies with a second transmission format, and adds a terminal address that complies with the second transmission format and corresponds to the destination address, when the detector detects a match.

2. The apparatus according to claim 1, further comprising:

a delay unit configured to delay participation of the apparatus in a tree identification protocol so that the apparatus is identified as a root node in a tree identification on a serial bus, wherein the second control command corresponds to a packet issued by the root node to another node on the serial bus.

3. An electronic apparatus, comprising:

a receiver configured to receive first control data transmitted in a transmission format associated with a LAN, the first control data including a remote activation request packet and a destination MAC address as a unique identifier indicative of a device to be controlled;

a producer configured to produce second control data from the received first control data by converting the remote activation request packet to a link-on packet that complies with a transmission format of an EEE 1394 bus, and adding a terminal address that complies with the transmission format of the IEEE 1394 bus and corresponds to the destination MAC address;

a memory configured to store contents of a plurality of specific bit patterns; and a detector configured to detect whether the remote activation request packet is a magic packet having a predetermined bit pattern or has a bit pattern matching one of the plurality of specific bit patterns stored in the memory, wherein the producer converts the remote activation request packet to the link-on packet that complies with a transmission format of an IEEE 1394 bus, and adds a terminal address that complies with the transmission format of the IEEE 1394 bus and corresponds to the destination MAC address, when the detector detects a match.

4. The apparatus according to claim 3, further comprising:

a delay unit configured to delay participation of the apparatus into a tree identification protocol so that the apparatus is identified as a root node in tree identification on the bus; and wherein the link-on packet is a packet issued by the root node and received by another node on the bus.

5. A remote activation control method, comprising:

receiving first control data transmitted in a first transmission format via a network, the control data including a first control command and a destination address of a device to be controlled, wherein the first control command and destination address comply with the first transmission format;

producing second control data from the received first control data by converting the first control command to a second control command that complies with a second transmission format and adding an address that complies with the second transmission format and corresponds to the destination address of the device to be controlled;

storing contents of a plurality of predetermined specific bit patterns;

detecting whether the first control command is a magic packet having a predetermined bit pattern or a specific pattern packet associated with one of the plurality of predetermined specific bit patterns; and converting the first control command to a link-on packet that complies with a second transmission format, and adding an address that complies with the second transmission format and corresponds to the destination address of the device to be controlled, when the detection indicates a match.

6. A remote activation control method comprising:

receiving first control data transmitted via a LAN and in a transmission format associated with the LAN, the first control data including a remote activation request packet and a destination MAC address as a unique identifier identifying a device to be controlled, wherein the remote activation request packet and the destination MAC address comply with the transmission format of the LAN;

producing second control data from the received first control data by converting the remote activation request packet to a link-on packet that complies with a transmission format of an IEEE 1394 bus and adding an address that complies with the transmission format of the IEEE 1394 bus and corresponds to the destination MAC address;

storing contents of a plurality of predetermined specific bit patterns;

detecting whether the remote activation request packet is a magic packet having a predetermined bit pattern or a specific pattern packet associated with one of the plurality of predetermined specific bit patterns; and converting the remote activation request packet to the link-on packet that complies with a transmission format of an IEEE 1394 bus, and adding an address that complies with the transmission format of the IEEE 1394 bus and corresponds to the destination MAC address, when the detection indicates a match.

* * * * *

UNITED STATES PATENT AND TRADEMARK OFFICE
CERTIFICATE OF CORRECTION

PATENT NO.     : 6,694,440 B1
DATED          : February 17, 2004
INVENTOR(S)    : Ishibashi

It is certified that error appears in the above-identified patent and that said Letters Patent is hereby corrected as shown below:

<u>Title page,</u>
Item [54], Title, change to read as follows:
-- METHOD AND APPARATUS THAT ENABLES REMOTE ACTIVATION OF A COMPUTER FROM A LAN WHEN THE COMPUTER IS CONNECTED TO THE LAN THROUGH A SERIAL BUS --.

<u>Column 9,</u>
Line 50, change "EEE" to -- IEEE --.

Signed and Sealed this

Fourth Day of May, 2004

JON W. DUDAS
*Acting Director of the United States Patent and Trademark Office*